United States Patent
Boczek

(10) Patent No.: US 9,613,200 B2
(45) Date of Patent: Apr. 4, 2017

(54) EAR BIOMETRIC CAPTURE, AUTHENTICATION, AND IDENTIFICATION METHOD AND SYSTEM

(71) Applicant: DESCARTES BIOMETRICS, INC., Blaine, WA (US)

(72) Inventor: Michael Boczek, Blaine, WA (US)

(73) Assignee: Descartes Biometrics, Inc., Blaine, WA (US)

( * ) Notice: Subject to any disclaimer, the term of this patent is extended or adjusted under 35 U.S.C. 154(b) by 0 days.

(21) Appl. No.: 14/800,901

(22) Filed: Jul. 16, 2015

(65) Prior Publication Data

US 2016/0026781 A1  Jan. 28, 2016

Related U.S. Application Data

(60) Provisional application No. 62/025,416, filed on Jul. 16, 2014.

(51) Int. Cl.
*G06F 21/32* (2013.01)
*G06K 9/00* (2006.01)

(52) U.S. Cl.
CPC ......... *G06F 21/32* (2013.01); *G06K 9/00885* (2013.01)

(58) Field of Classification Search
CPC .............................. G06F 21/32; G06K 9/00885
USPC ........................................................ 726/18
See application file for complete search history.

(56) References Cited

U.S. PATENT DOCUMENTS

2010/0308999 A1* 12/2010 Chornenky .............. G08B 6/00
                                                         340/573.1
2013/0236066 A1*  9/2013 Shubinsky ......... G06K 9/00899
                                                         382/115

OTHER PUBLICATIONS

Chen, Hui, et al., "Human Ear Recognition in 3D"; IEEE Transactions on Pattern Analysis and Machine Intelligence Year: 2007, vol. 29, Issue: 4 pp. 718-737, DOI: 10.1109/TPAMI.2007.1005.*

* cited by examiner

*Primary Examiner* — Hadi Armouche
*Assistant Examiner* — Angela Holmes
(74) *Attorney, Agent, or Firm* — Olympic Patent Works PLLC

(57) ABSTRACT

The current document discloses an ear-biometrics-based authentication and identification system that includes an ear-image-capture subsystem that generates an image of a user's ear, a template-generation subsystem that extracts features from the generated image to generate a template that is stored in an electronic memory, and a template-comparison subsystem that compares the generated template to previously generated and stored templates in order to identifier the user.

9 Claims, 7 Drawing Sheets

EAR BIOMETRIC CAPTURE, AUTHENTICATION, AND IDENTIFICATION METHOD AND SYSTEM

CROSS-REFERENCE TO RELATED APPLICATION

This application claims benefit of Provisional Application 62/025,416, filed Jul. 16, 2014.

TECHNICAL FIELD

The current application generally relates to the technical field of biometrics and, in particular, to methods and systems that carry out automated ear biometric capture, ear biometric identification, and ear biometric authentication.

BACKGROUND

Traditionally, an individual establishes his or her identity by using passports and identity cards or by remembering and using passwords and/or personal identification numbers (PINs) to identify himself or herself and to gain access to secure areas, data, or systems. Unfortunately, passports and identity cards can be lost, duplicated, or stolen. PINs and passwords can easily be forgotten, observed, or intentionally shared with others. As a result, major security issues have arisen for both individuals and corporations. Individuals are concerned with identity theft and privacy. Corporations are concerned with theft of data, intellectual property, and trade secrets. Both individuals and corporations continue to seek new methods and systems for identification and authentication.

DETAILED DESCRIPTION

Figure 1:
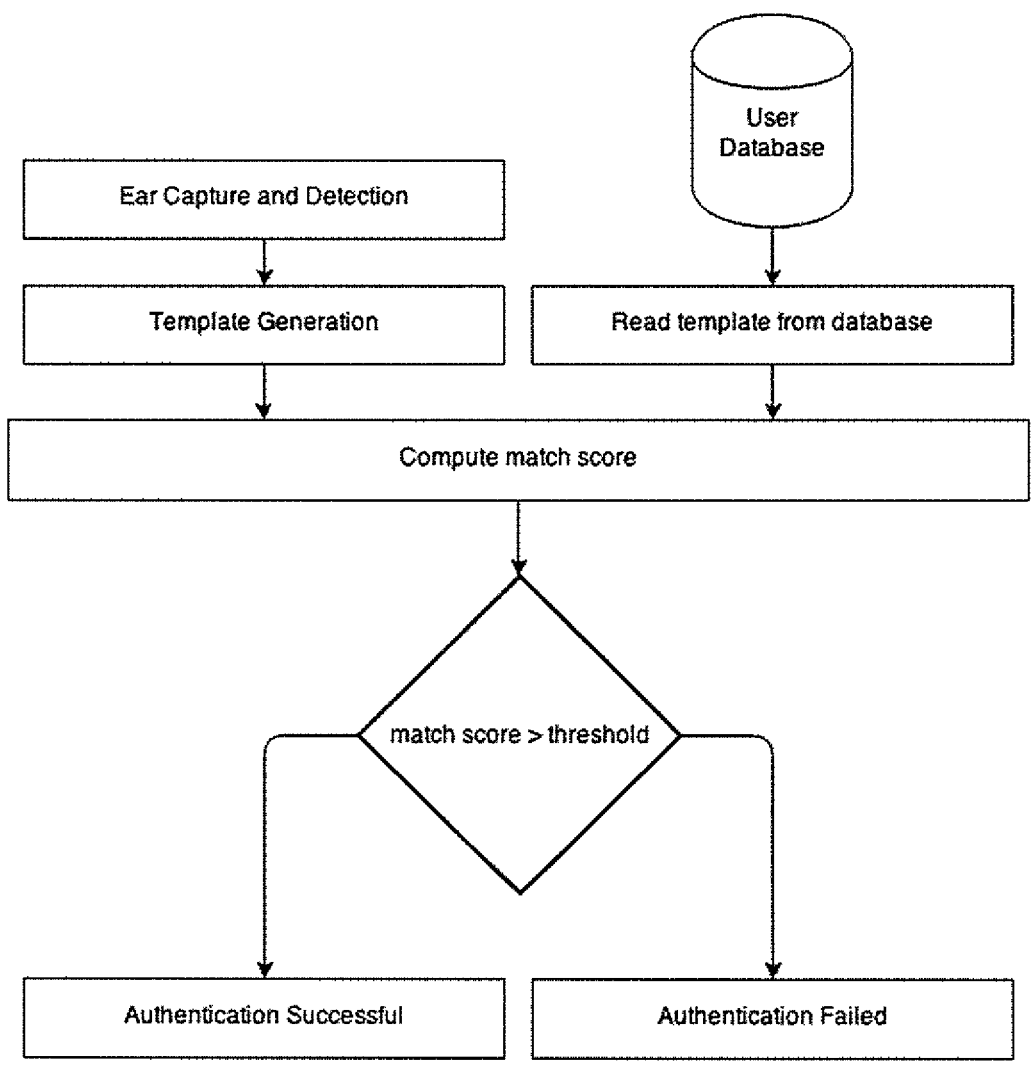
FIG. 1 provides an authentication flow diagram.

The current document discloses an ear-biometric capture, authentication, and identification system. The disclosed implementation is designed for smartphone devices. The disclosed implementation verifies an individual's identity. An individual's identity is verified as an authorized operator by utilizing physiological biometric data derived from images of an ear captured by a smartphone.

The ear biometrics offer the robustness and reliability of fingerprinting with the ease of use found in face recognition systems, but without many of the limitations and constraints of fingerprint-based and face-recognition based authentication and identification. An ear is as unique as a fingerprint and provides a stable basis for authentication and identification because the ear does not significantly change in individuals of ages between 8 to 70. Because smartphone processing power has become comparable to most lower end desktops, use of ear-biometrics can now feasibly be implemented as a smart-phone application.

Biometrics is the science of identifying an individual and verifying an individual's identity by obtaining physiological and behavioral metrics associated with the individual. Biometrics is a rapidly evolving technology and is currently used in forensic sciences as well as in a broad range of civilian applications. Biometrics is currently finding acceptance in technology applications as a form of identity management and access control.

There are currently five leading types of biometrics marketed for technology applications, including face-based, iris-based, fingerprint-based, voice-based, and ear-based biometrics. Of the five types of biometrics, ear-based biometrics present the most promising features for the mobile market when considering cost, convenience, robustness, and reliability. Facial recognition is hindered by the ever-changing nature of expressions, use of cosmetics, changing hairstyles and facial hair, and changing effects of light and shadow during imaging. Fingerprint-based and iris-recognition-based technologies are the most widely used and well-known biometrics. They have a long history of proven reliability in law-enforcement applications but are associated with practical limitations. Most notably, fingerprint-based and iris-recognition-based metrics are expensive to capture, store, retrieve, and compare, which explains why they tend to be used almost exclusively by law enforcement (with the exception of the recently released Apple and Samsung fingerprint recognition). Also, only moderate skill is needed to lift a fingerprint from a flat surface for subsequently use in defrauding fingerprint-based security features. Fingerprinting and iris scanning are also associated with a criminal stigma. Voice and speech-recognition technologies have progressed rapidly in recent years, appearing in a broad range of devices from Bluetooth headsets to phones and cars. While voice recognition is natural, intuitive, and non-distracting, it suffers from a number of practical limitations. A voice-recognition system is generally trained to understand and recognize a user's speech pattern, which involves significant time and effort. Voice-recognition systems generally cannot be used in noisy environments and are easily overheard by others in close proximity.

The ear is as unique as a fingerprint, acquisition of ear-based biometrics is generally less invasive than an iris scan, ear-based biometrics are as natural and intuitive to use as voice recognition, and ear-based biometrics cost effective because acquisition and analysis of ear-based biometrics can be carried out using hardware currently embedded in smartphones.

Smartphones, tablets, laptop computers, and USB drives are convenient and easy to use, but they may not adequately secure personal privacy and data. Mobile computing devices can store large amounts of data, provide a gateway to external data stores, and are highly portable, but are frequently left unprotected. They are easy to steal or lose, and, unless precautions are taken, an unauthorized person can gain access to the information stored on them or accessed through them. Even when not stolen or lost, intruders can gain access to sensitive information when mobile computing devices are left alone and unprotected and when harmful software is installed on them. The results can include crippled devices, personal data loss, identity theft, and disclosure of private data.

Mobile computing devices are of concern both because of the data that might be stored on them and because they may provide access to other services that store or display non-public data. This access may be enabled because the device contains stored passwords and/or security certificates that identify the device or its user to an email system, virtual private networks (VPNs), and other access restricted environments.

The mobile device market relies on two forms of security: knowledge-based security and biometrics-based security. Knowledge-based security relies on PINs and passwords. Biometrics-based security relies on the unique attributes of an operator. Because PINs and passwords are easily forgotten, stolen, shared, hacked, or even written down, knowledge-based security compromises both convenience and reliability. The disclosed implementation's biometrics-based security features provide greater reliability than provided by knowledge-based security, although both can be used together.

Authentication by biometrics introduces non-repudiation into a transaction. A recipient of information can be assured that the originator cannot deny that the originator provided the information. As a robust and reliable biometrics-based authentication technology, the disclosed implementation allows a user to authenticate or identify himself or herself using a unique biometric. Biometrics-based authentication and identification can be local or cloud based. A user's biometrics-based profile can be as small as 10 kilobytes ("kB") and is easily transmittable across the most limited of network connections.

Figure 2:
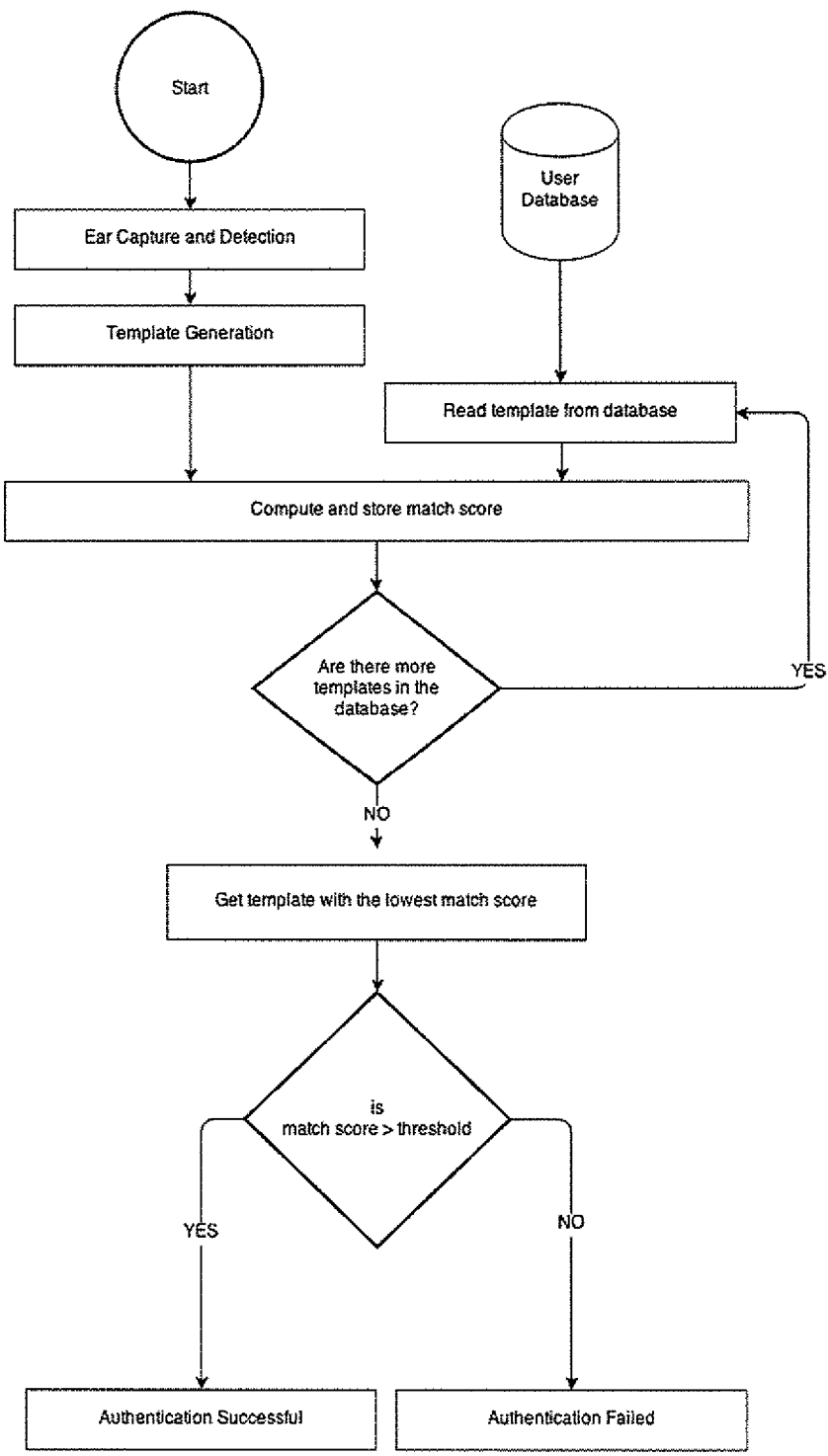
FIG. 2 provides an identification flow diagram.

The disclosed system provides for authentication as well as identification of a template. The system uses a template to authenticate or identify a user. A user's profile consists of one or more templates. Authentication, or one-to-one matching, described in FIG. 1, compares an acquired template to a stored user profile. In authentication, the user attempting to authenticate himself or herself is known beforehand. Identification, or one-to-many matching, described in FIG. 2, compares an acquired template to templates in a database and selects a profile from the database that most closely matches the acquired template. The acquired template is then authenticated with the selected profile to confirm the match. When the match fails, the system determines the acquired template does not correspond with a template stored in the database.

The disclosed system allows a user to adjust the authentication method's match-confidence thresholds. The implementer can adjust the security thresholds for an entire implementation of the disclosed system and a user can adjust thresholds for the user's security profile. For example, a smartphone application implementing the disclosed system can provide a user with the ability to adjust the user's match confidence thresholds. However, a banking system can enforce a higher, but static, threshold confidence. In effect, adjustments can be made to the security threshold that fits the needs of the implementation.

Templates captured by the disclosed system are rated through a system that scores how well a template matches with one or more profiles stored in the system's database. By adjusting this score, an implementer or user can specify how well the template should match a profile. Specifying a higher score tightens the match criteria and thus makes access more restrictive. While a stricter match confidence, or higher required score, may potentially compromise user convenience by generating more false rejections, a stricter match confidence provides the implementing system with a higher level of security. Likewise, a lower match confidence generally results in a higher number of false acceptances but provides greater convenience or ease of entry.

To produce templates, the disclosed authentication and identification systems employ a capture system utilizing the front facing camera of a mobile device. Upon initialization of the capture system, a series of camera frames is recorded as color images. In addition, an array of built-in hardware sensors provide raw data with a high level of precision and accuracy. Depending on the device in which the disclosed capture implementation is running, an application has access to, among many other types of sensors, a three-axis accelerometer, a proximity sensor, a light sensor, and a touch-capacitive screen. The specific sensors available to the application are device-dependent and vary between configurations. However, the disclosed implementation generally relies on sensors that are commonly available in modern smartphones.

Figure 3:
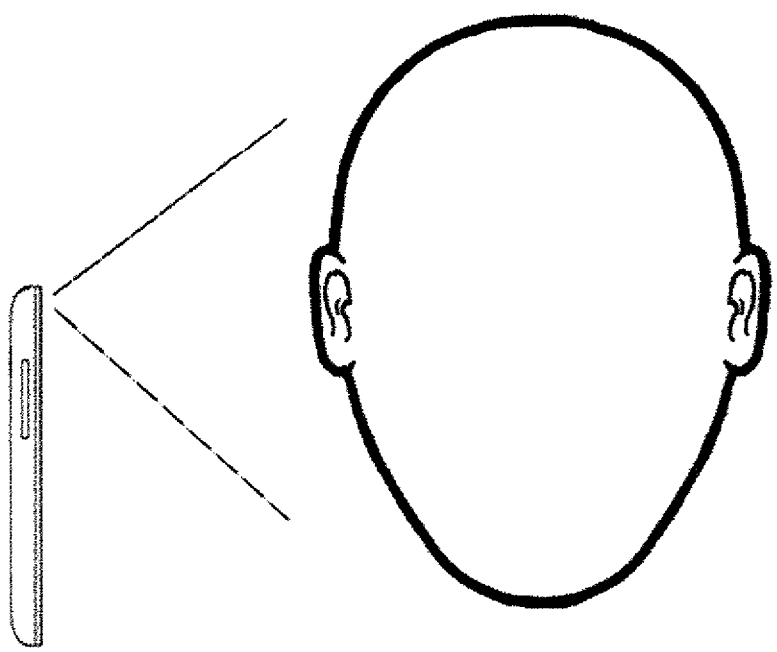
FIG. 3 illustrates capture, showing phone next to head.

As shown in FIG. 3, with the application running, a user raises a smartphone to the user's ear in a natural way, as when answering a phone call. After contacting the smartphone with the user's ear, the user pulls the phone away in a steady motion until the phone is shoulder distance from the head. Capture begins when the ear leaves the phone's touch screen and the proximity sensor determines the head is no longer against the device. Capture continues for 1-2 seconds, recording data needed to generate a unique biometric profile for the user. The capture process relies on a data storage system capable of persisting a user's profile. This data storage system may be present locally on the smartphone or externally as a cloud-based solution.

Figure 4:
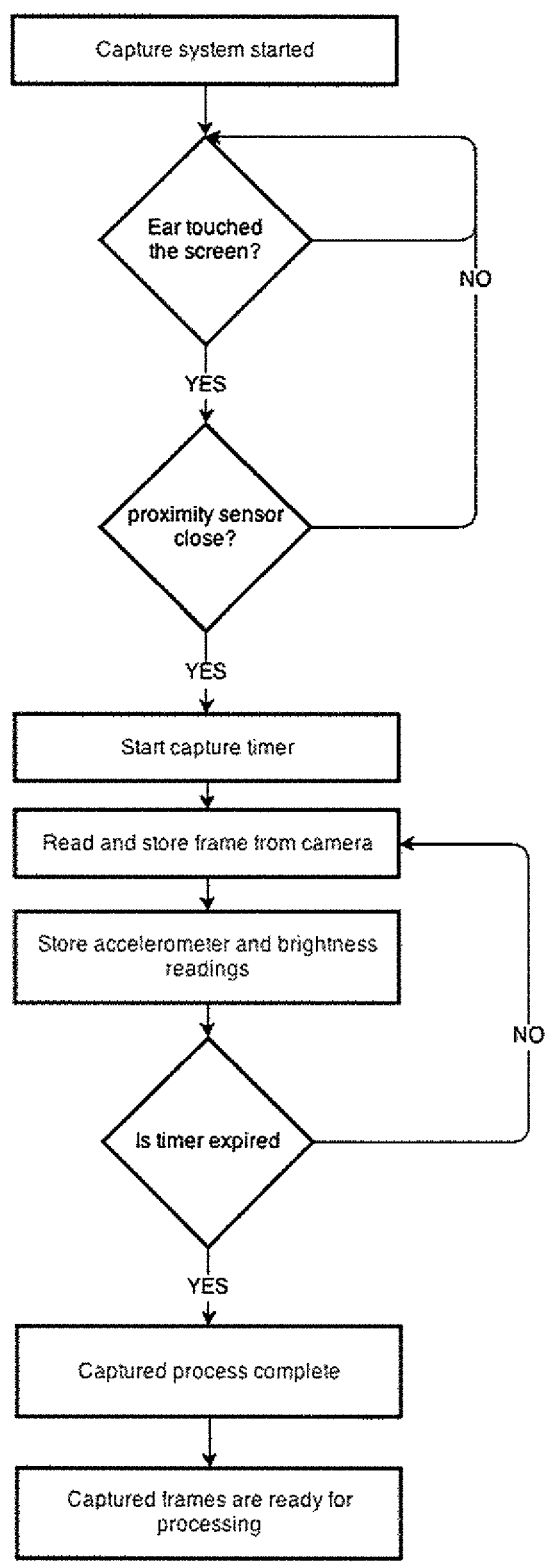
FIG. 4 provides a capture flow diagram.

The disclosed capture system, described in FIG. 4, relies on the front facing to camera to record image frames in real-time. The number of frames recorded is dependent on the hardware in which the disclosed implementation is running, generally ranging from 15 to 60 frames per second. In addition to the camera frames, the orientation of the phone is read from the accelerometer and the brightness, in lux, of the capture environment is read from the light sensor. Each of these readings is recorded when a frame is captured. The readings are then associated with the current frame as metadata and stored in a temporary buffer. This system is illustrated in FIG. 3.

The brightness of the environment during capture, as determined by the light sensor, is used to dynamically dim or brighten the screen. When the environment is dark, the screen brightness is increased in an attempt to illuminate the ear. Similarly, when the environment is too bright, the screen brightness is dimmed and the exposure of the camera is reduced and locked to avoid over exposure.

During capture, the 3-axis accelerometer provides a spatial awareness of the device and serves dual purposes. The 3-axis accelerometer allows the system to estimate the rotation of the phone from a vertical orientation. The ear-detection process uses a capture image in which the ear is vertically oriented. The angle of rotation of the phone at the time of capture provides a rotational correction. The 3-axis accelerometer aids in deterring nefarious users. The accelerometer readings during capture are monitored for consistency within a relative threshold established when capture began. When the reading deviates beyond these thresholds, the application assumes the capture has been aborted by the user intentionally or accidentally or that perhaps another individual is attempting to bypass the system and capture an ear image.

Figure 5:
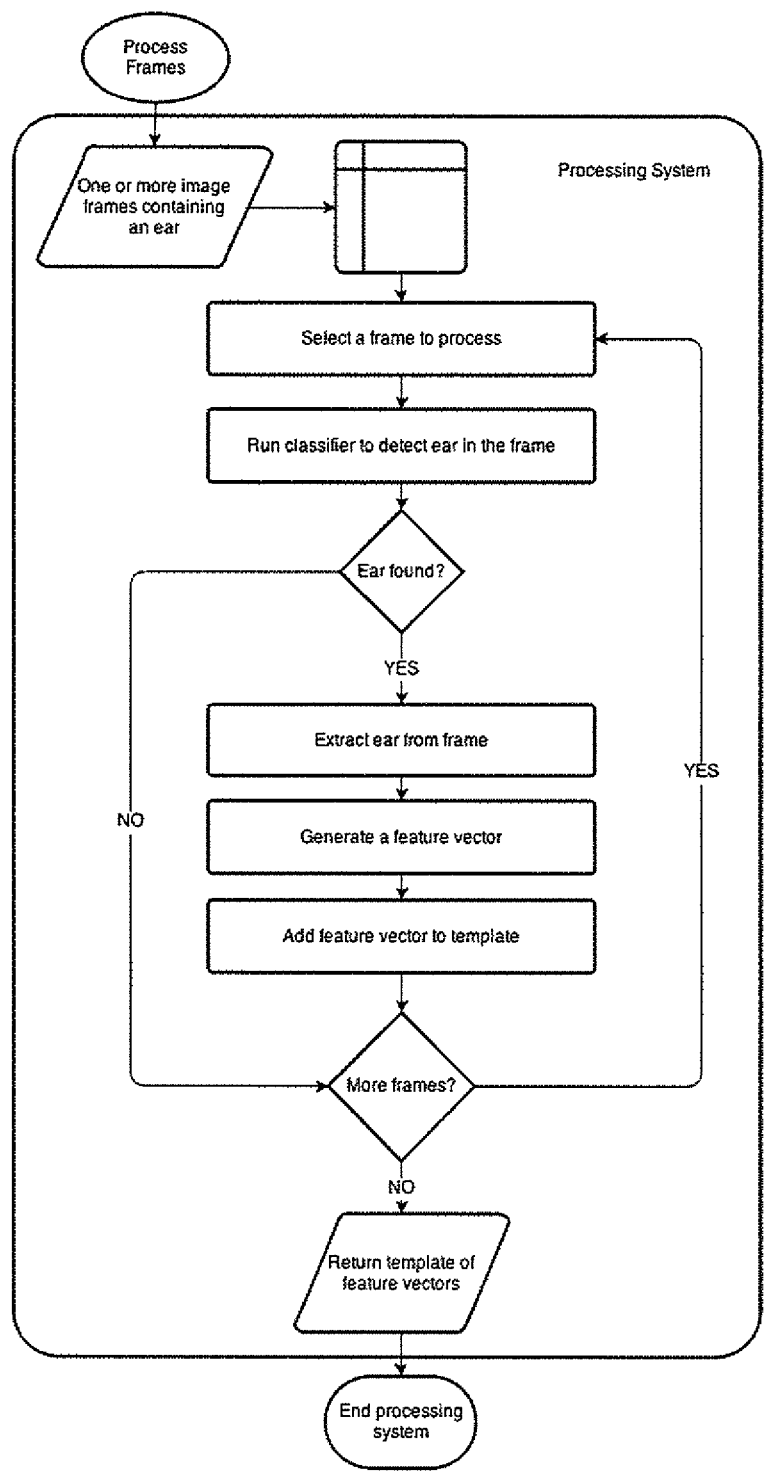
FIG. 5 provides a processing flow diagram.

Upon expiration of a timer, the capture process of the disclosed system is complete. The system stops recording camera frames and discontinues reading data from the sensors. The capture system functions as one possible input to the disclosed pre-processing system and serves as the basis of automatic profile generation In the disclosed system, as shown in FIG. 5, the processing of one or more input images, or frames, functions to detect the presence of an ear, extract a portion of the image corresponding to the ear, and generate a template. The processing system can operate independently of the disclosed capture system. Images input to the disclosed processing system may or may not contain an ear. The ear may or may not be vertically oriented in the frame. The disclosed process of ear detection, extraction, and template generation for each input image is autonomous and independent of the capture mechanism.

When processing is requested for more than one frame, an order in which the frames are processed is selected to provide computational efficiency. Frame selection decides the order and subset of input images that are processed. The frame-selection process is dependent on the context of capture. The input frames can be processed by the system sequentially or in a more efficient manner when resources are constrained. For example, when a user attempts authentication over a network via a mobile device, a more efficient selection process may be beneficial to decrease computation time by intelligently selecting a subset of the input frames. However, during enrollment, a user's frames may be sequentially processed because running time is not constrained.

Sequential selection is used by the disclosed system to process each input frame in the order in which it is recorded. Processing input frames sequentially is more resource intensive but insures that each image is searched. When resources, such as processing power and time, are limited (eg. mobile devices), the disclosed system utilizes a more resource efficient selection method. By reducing the number of times detection and extraction is run for a given capture, the running time can be significantly reduced.

The disclosed system applies a modified binary search to the series of input frames and thus greatly reduces the number of detections and extractions performed—especially with a larger quantity of input frames. The modified binary search selects frames until an ear is found. Upon detection of an ear, the binary search is discontinued. With a successful detection of an ear, the immediate frames surrounding the frame containing the ear are processed until no additional ears are detected. This process is optimized for capture systems, which sequentially record images so that frames surrounding any given frame are likely to be similar.

To detect an ear in a selected input image, the disclosed system relies on a cascade classifier provided by the OpenCV library. OpenCV is an open-source cross-platform library of programming functions aimed primarily at real-time computer-vision projects. The project is released under a BSD license and is free for both academic and commercial use. Classifiers are systems trained to quickly and efficiently detect arbitrary objects in images. The cascade classifiers provided by the OpenCV project were previously trained to detect both right and left ears in images. However, for the classifier to properly detect an ear, the ear in the image needs to be oriented vertically so that the lobe is at the bottom of the frame. A small degree of rotational variance is acceptable (+/−10 degrees). To account for rotational variances of the ear in an input frame, the system rotates the image before a successful detection can occur.

Rotation of the captured frames facilitates automation of applying the classifier. The disclosed system rotates each image a maximum of 120 degrees in each direction. The maximum rotation of 120 degrees was chosen to encompass the possible rotations of an image based on the way phones are typically held. The 120-degree threshold is an optimization to further reduce computational time for smartphone capture. Upon detection of an ear by the classifier, the location, size, and rotation are recorded and the detection process for the frame is terminated.

Given an angle within a 240-degree arc, the system applies the classifier to the image rotated to this starting angle. The starting angle of the disclosed system defaults to 0 degrees, or an un-rotated orientation. In a system where frames are captured sequentially over a period of time, when an ear has been detected in a previously classified frame, it is likely that surrounding frames also contain an ear at a similar degree of rotation. Thus, the rotation that previously yielded a positive detection is used by the disclosed system as a starting point for the current frame. In the event that no previously classified frames have contained an ear, the starting angle can be estimated based on the orientation of the capture device at the time of capture. When accelerometer data is unavailable, the disclosed system resorts to the default starting rotation of zero degrees.

The starting angle may not produce a positive detection. The system therefore proceeds to systematically rotate the image both clockwise and counterclockwise, attempting to detect an ear in each variant. The amount of rotation in each direction is typically less than 10 degrees. For example, when the starting rotation is zero and the rotational jump in each direction is 10 degrees, the image may be rotated to −10 and 10 degrees, then −20 and 20 degrees, and so on until an ear is detected or the amount of rotation exceeds the rotational threshold. When the image has been rotated to a point that exceeds the rotational threshold and no ear has been detected, the system determines that no ear is present and the frame is discarded. Upon completion of the detection process, any image determined to not contain an ear is discarded.

The extraction process is responsible for cropping every frame that was previously determined to contain an ear. Based on the rotation, location, and size determined by the detection process, the original frame is cropped to only contain the ear. The cropped area is buffered in each direction to ensure the full ear is contained in the image. The cropping of each image results in a series of one or more images containing only the detected ear from the original input image. These images become the basis for template generation.

A user's template is used by the system to authenticate or identify a user. A user's template contains one or more feature vectors. The system produces a single feature vector for each ear image. A feature vector is a series of histograms produced by applying one or more filters to the ear image. A histogram is a series of 256 bins, labeled 0-255, each containing a single value. Each bin label represents a color in an 8-bit grayscale image where 0 is black and 255 is white. The color value of each pixel corresponds to the bin label in the histogram. The value in each bin represents the quantity of pixels in the processed image with the corresponding color value.

To identify local features of an ear, the disclosed system applies a bank of banana wavelets to the image. A banana wavelet, kernel or matrix, is a localized filter generated by rotating and curving a complex wave function. Each wavelet is aimed at attaining a responses which describe the various curved lines in an ear, such as the helix, anti-helix, and intertragic notch. A strong response of a particular kernel, when convolved with an ear image, indicates a similarity between the wavelet and the local structure of the ear. Convolution is a common task that applies a filter to an image and outputs a new modified image. These strong responses produce a local maxima or white pixels in the filtered image whereas areas with weaker responses produce darker shades of gray.

Each kernel is designed to locate a specific structure in an ear. The region of an image that contains the desired structure is predictable and predefined in the system. This predictability allows the system to segment or crop the ear image to contain only desired region. The segmentation provides a more directed and accurate response for a given wavelet.

To produce a feature vector for an ear image the system first applies a threshold to remove hair and other large curved objects that can be mistaken for curves in the ear. The thresholded image is then denoised to remove small curves that can be mistaken for curves of the ear. The denoised image is then equalized to accentuate the curves in the ear and to mute the areas that are not curves. The equalized image is then convolved with each wavelet in bank of banana wavelets.

Figure 6:
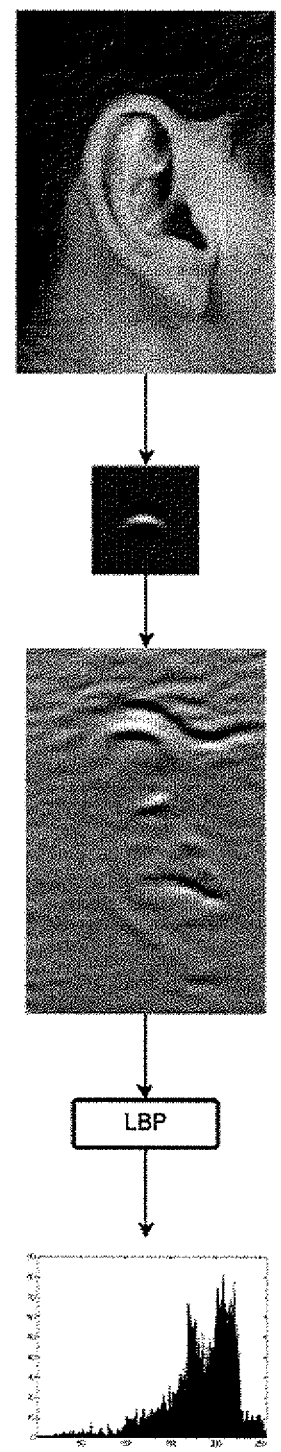
FIG. 6 illustrates template generation.

Each wavelet, when applied to the equalized image, produces a unique response image. The response image for each wavelet allows the system to locate the approximate position of its corresponding local structure. A threshold is applied to a response image that isolates the intended local structure. A local-binary-pattern ("LBP") method is then applied to each response image and an LBP response image is generated. The LBP response image is then quartered into equally sized regions. Histograms are then generated for each portion of the quartered regions that lie within the segmentation region of a kernel. The series of histograms generated for each kernel's LBP response image, are, collectively, the feature vector of one image. One or more feature vectors may be produced and become a user's template. The process in which a template is generated is demonstrated in FIG. 6.

Figure 7:
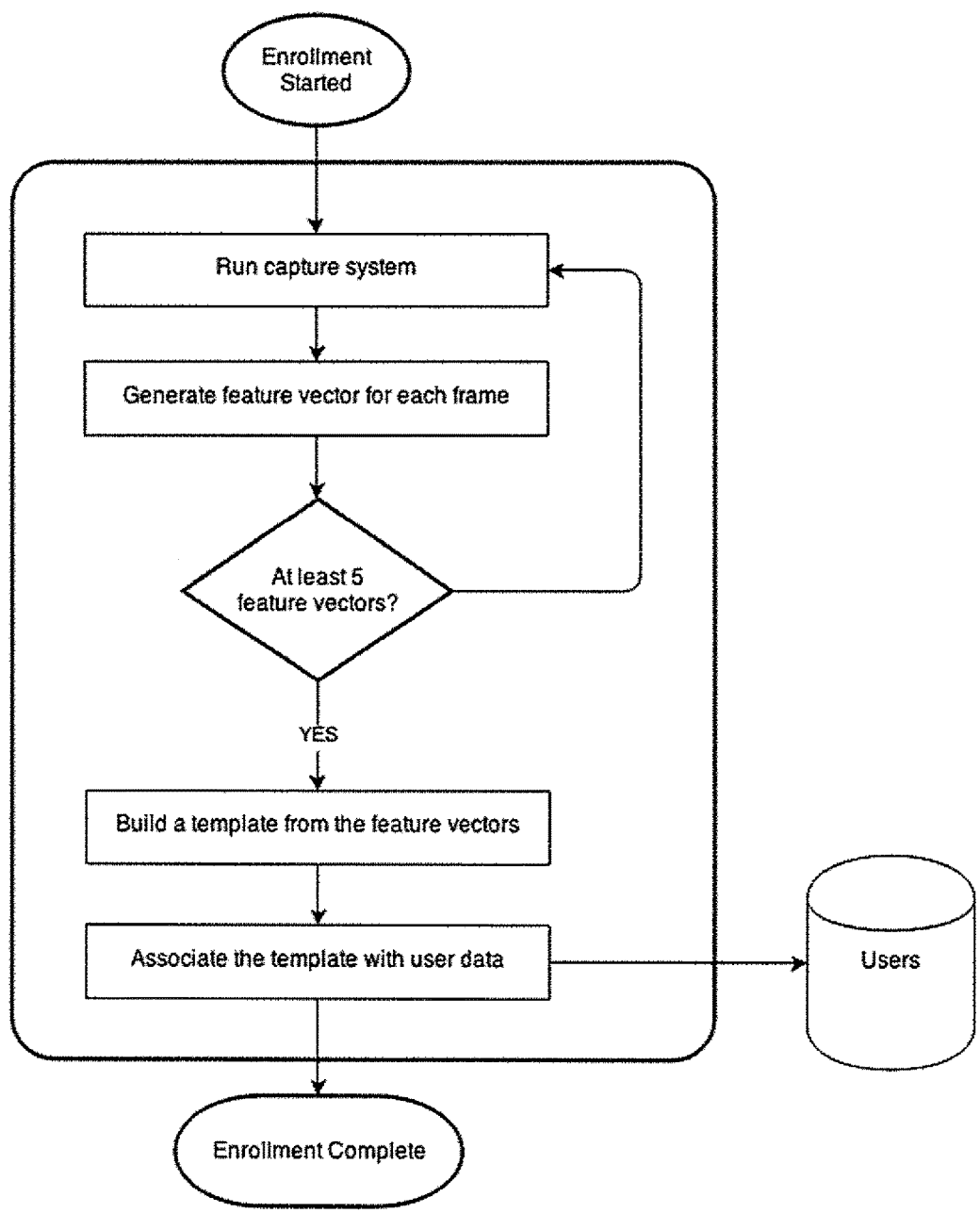
FIG. 7 provides an enrollment flow diagram.

The enrollment process, as described in FIG. 7, involves the user performing one or more captures until a profile can be established. A minimum number of separate ear images are used to successfully build a profile. A template is generated for each ear image stored as the user's profile in the implementing application's database. Non-qualifying templates are discarded and additional captures are requested until the disclosed implementation has a database sufficient for scoring. A capture is deemed as non-qualifying when a minimum number of frames with ears are not successfully captured. Once an acceptable number of frames are captured, the users profile is generated and stored in the implementing systems database. This profile serves as a basis for comparison each time an authentication or identification attempt is made via the disclosed system.

The disclosed system engages a refined set of methods to compare a captured template to the user's template or to templates in a database—stored locally on the user's device or in the cloud. An original profile is generated during enrollment and includes of one or more feature vectors. Each of the features vectors constitutes the biometric profile of a single ear image of the operator. The authentication methods collectively rate the match between two templates. Authentication is awarded, given a submitted template meets an acceptable level of quality, after being matched with the user's stored template. The score produced by the authentication method is normalized to an integer value between 0 and 100. Similarly, identification scores the current template to templates stored in the disclosed system's user database. The profile in the database that most closely matches the template is selected as the potential match. When the match score between the template and the potential match meets the quality of authentication, identification has been achieved. Identification fails when the user most closely matched to the template does not meet an acceptable level of quality. Comparison of two templates, each with multiple features vectors, implies that each feature vector in the first template must be compared to each feature vector in the second template. Hence, in order to calculate a score between two templates, individual scores of each feature vector contained in the templates are determined.

The individual scoring method produces a score by comparing a single feature vector, or series of histograms, with each feature vector in a template, one at a time. The score is predicated on the series of histograms derived from ear images. Determining how closely two-feature vectors match is accomplished by computing the intersection of each histogram with the corresponding histogram in the other feature vector. The intersection of two histograms produces an integer value that represents how similar two histograms are to each other. With the intersection of each histogram computed, the system computes a summation of the intersection values. The summation of the intersected values represents the individual score between two feature vectors.

By definition, each template being compared may contain one or more feature vectors. The system computes a score for each feature vector in one template to every feature vector in the other template. The system determines that the two match when one or more individual scores exceed a minimum acceptable threshold to be considered a positive match.

The authentication system involves a comparison between two templates whereas the identification system involves comparison between a template and every other template in the disclosed systems database of users. Authentication is achieved when the match score of two templates exceeds a predefined threshold. Identification is the result of comparing a template to other templates in the database and performing authentication on the template most closely matching the input template.

The disclosed systems, when combined, comprise a fully automated ear biometric captured, detection, authentication, and identification system. The disclosed implementation of mobile capture is merely one possible implementation of an ear capture system. The disclosed systems of detection, extraction, template generation, identification, and authentication can function independently of the disclosed capture system.

Although the present invention has been described in terms of particular embodiments, it is not intended that the invention be limited to these embodiments. Modifications within the spirit of the invention will be apparent to those skilled in the art. For example, any of many different design and implementation parameters, including hardware platform, operating system, programming language, modular organization, data structures, control structures, and other such parameters may be varied to produce a variety of alternative implementation.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded to the widest scope consistent with the principles and novel features disclosed herein.

The invention claimed is:

1. An ear-biometrics-based authentication and identification system comprising:
    a smart phone;
    an ear-image-capture subsystem within the smart phone that generates meta-data-associated images of a human ear by:
        employing a front facing camera of the smart phone to record a series of camera frames as color images as the smart phone is pulled away from contact with a human ear,
        employing one or more smart-phone sensors to generate additional data that is recorded as meta data that is associated with the color images, the one or more smart-phone sensors selected from among
            a three-axis accelerometer that generates orientation angles from which a rotation of the phone from a vertical orientation is estimated,
            a proximity sensor that generates indication of the distance from the human ear to the smart phone,
            a light sensor that generates an indication of the ambient illumination in the environment, and
            a touch-capacitive display screen that provides indications of points on the surface of the display screen at which the surface of the human ear contacts the display screen;
    a template-generation subsystem that extracts features from the meta-data-associated images to generate a template that is stored in an electronic memory;
    a template-comparison subsystem that
        selects, by a modified-binary-search subsystem of the template-generation subsystem, color images from the recorded color images for feature extraction until an ear is detected in a color image, and
        compares the generated template to previously generated and stored templates in order to identifier the user, the template-comparison subsystem generating a score that indicates how well the generated template matches a previously generated and stored template; and
        a user interface through which a user can specify a threshold score that determines whether or not the generated template is determined by the template-comparison subsystem to correspond to the human ear from which the previously generated and stored template was generated.

2. The ear-biometrics-based authentication and identification system of claim 1 wherein color images sequentially adjacent to the color image in which an ear is identified are processed until no additional ears are detected.

3. The ear-biometrics-based authentication and identification system of claim 1 wherein the template-generation subsystem uses an OpenCV library cascade classifier, trained to quickly and efficiently detect vertically oriented ears.

4. The ear-biometrics-based authentication and identification system of claim 3 wherein the template-generation subsystem rotates a color image through a range of orientations to obtain a rotated color image in which a sub-image of an ear is vertically oriented.

5. The ear-biometrics-based authentication and identification system of claim 3 wherein the template-generation subsystem crops the color image in which an ear is detected to obtain a sub-image containing only the ear.

6. The ear-biometrics-based authentication and identification system of claim 3 wherein the template-generation subsystem applies a threshold to a color image remove hair and other large curved objects that can be mistaken for curves in an ear.

7. The ear-biometrics-based authentication and identification system of claim 3 wherein the template-generation subsystem denoises a color image to remove small curves that can be mistaken for curves of the ear.

8. The ear-biometrics-based authentication and identification system of claim 6 wherein the template-generation subsystem identifies local features of an ear in a color image by applying a bank of banana wavelets to the color image.

9. The ear-biometrics-based authentication and identification system of claim 1 wherein a template contains one or more feature vectors.

* * * * *